United States Patent
Chen

(10) Patent No.: US 9,190,835 B2
(45) Date of Patent: Nov. 17, 2015

(54) POWER FACTOR CORRECTION (PFC) POWER CONVERSION APPARATUS AND POWER CONVERSION METHOD THEREOF

(71) Applicant: Power Forest Technology Corporation, Hsinchu (TW)

(72) Inventor: Chun-Teh Chen, Taichung (TW)

(73) Assignee: Power Forest Technology Corporation, Hsinchu County (TW)

( * ) Notice: Subject to any disclaimer, the term of this patent is extended or adjusted under 35 U.S.C. 154(b) by 233 days.

(21) Appl. No.: 13/776,736

(22) Filed: Feb. 26, 2013

(65) Prior Publication Data

US 2013/0329472 A1    Dec. 12, 2013

(30) Foreign Application Priority Data

Jun. 8, 2012   (TW) .............................. 101120703 A

(51) Int. Cl.
| | |
|---|---|
| H02M 1/42 | (2007.01) |
| H02H 7/125 | (2006.01) |
| H02M 1/32 | (2007.01) |
| H02M 1/10 | (2006.01) |
| H02M 1/00 | (2007.01) |

(52) U.S. Cl.
CPC .............. *H02H 7/1252* (2013.01); *H02M 1/10* (2013.01); *H02M 1/32* (2013.01); *H02M 1/4225* (2013.01); *H02M 2001/0009* (2013.01); *H02M 2001/0025* (2013.01); *Y02B 70/126* (2013.01)

(58) Field of Classification Search
CPC ................... H02M 1/4225; H02M 2001/0025; H02M 3/156; H02M 1/32
See application file for complete search history.

(56) References Cited

U.S. PATENT DOCUMENTS

| | | | |
|---|---|---|---|
| 6,768,655 B1 * | 7/2004 | Yang et al. ................. | 363/21.01 |
| 2007/0145956 A1 * | 6/2007 | Takeuchi ...................... | 323/207 |
| 2010/0128501 A1 | 5/2010 | Huang et al. | |
| 2011/0141778 A1 * | 6/2011 | Wu et al. ......................... | 363/95 |
| 2012/0113689 A1 | 5/2012 | Chen et al. | |
| 2012/0300515 A1 * | 11/2012 | Carletti et al. .................. | 363/74 |

FOREIGN PATENT DOCUMENTS

| | | |
|---|---|---|
| TW | I232628 | 5/2005 |
| TW | I251979 | 3/2006 |

(Continued)

OTHER PUBLICATIONS

"Office Action of Taiwan Counterpart Application", issued on Jul. 16, 2014, p. 1-p. 11, in which the listed references were cited.

*Primary Examiner* — Harry Behm
(74) *Attorney, Agent, or Firm* — Jianq Chyun IP Office

(57) ABSTRACT

A power factor correction (PFC) power conversion apparatus and a power conversion method thereof are provided. In the invention, by switching a detection switch disposed inside a control chip and connected to a detection pin of the control chip at a certain time, and performing a detection of an input voltage received by a boost power conversion circuit at the certain time through a collocation between a current detection auxiliary circuit and a current detection main circuit. Accordingly, an over current protection (OCP) point corresponding to whether an OCP mechanism is activated is compensated according to the detected result, and thus the detection manner of the OCP performed by the invention can be adaptively suitable for different input voltages. In the invention, according to the detected result, a brown out protection also can be performed, and the output of the boost power conversion circuit also can be changed or determined.

11 Claims, 5 Drawing Sheets

(56) References Cited

FOREIGN PATENT DOCUMENTS

| TW | 201010258 | 3/2010 |
| TW | 201106600 | 2/2011 |
| TW | 201123692 | 7/2011 |

* cited by examiner

POWER FACTOR CORRECTION (PFC) POWER CONVERSION APPARATUS AND POWER CONVERSION METHOD THEREOF

CROSS-REFERENCE TO RELATED APPLICATION

This application claims the priority benefit of Taiwan application serial no. 101120703, filed on Jun. 8, 2012. The entirety of the above-mentioned patent application is hereby incorporated by reference herein and made a part of this specification.

BACKGROUND OF THE INVENTION

1. Field of the Invention

The invention relates to a power conversion technique, and more particularly, to a boost-based power factor correction power conversion apparatus and a power conversion method thereof.

2. Description of Related Art

A power conversion/supply apparatus is mainly used for converting a high-voltage and low-stability alternating current (AC) voltage provided by a power company into a low-voltage and stable direct current (DC) voltage suitable for various electronic devices. Therefore, the power conversion apparatus is widely used in electronic devices such as computers, office automation equipments, industrial control equipments, and communication equipments, etc.

The front-end of the current power conversion/supply apparatus is a power factor correction (PFC) power converter, and the back-end thereof is a pulse width modulation (PWM) power converter. Taking the power factor correction power converter as an example, the control structure thereof has mostly been employed the pulse width modulation (PWM) control chip Conventionally, most of the current pulse width modulation control chips are built-in a "fixed" over current protection (OCP) point to perform a detection of the over current protection (OCP) in order to protect the power factor correction power converter from damaging due to the phenomena of over current (OC), and thus achieving the purpose of protecting the power factor correction power converter. However, since a receiving range of the power factor correction power converter is from 90VAC to 264VAC, and over current protection points corresponding to whether the respective over current protection (OCP) mechanisms are activated for the different input voltages of 90VAC to 264VAC are not identical. Therefore, the detection manner of the over current protection (OCP) performed by the conventional pulse width modulation control chip can not adaptively applied to different input voltages, thereby resulting in the power factor correction power converter may be damaged due to the effect of over current.

SUMMARY OF THE INVENTION

Accordingly, the invention is directed to a boost-based power factor correction power conversion apparatus and a power conversion method thereof, so as to solve the issues/problems mentioned in the related art.

An exemplary embodiment of the invention provides a power factor correction power conversion apparatus including a boost power conversion circuit, a control chip and a current detection auxiliary circuit. The boost power conversion circuit is configured to receive an input voltage and convert the input voltage in response to a pulse width modulation signal, so as to generate and provide an output voltage. The control chip is coupled to the boost power conversion circuit, and configured to generate the pulse width modulation signal in response to a power supplying requirement to control an operation of the boost power conversion circuit. The current detection auxiliary circuit is coupled to the boost power conversion circuit and a detection pin of the control chip, and configured to assist the control chip to perform a detection of the input voltage in a detection phase. The control chip may compensate an over current protection point corresponding to whether an over current protection mechanism is activated in response to a first detection result of the detected input voltage.

In an exemplary embodiment of the invention, the boost power conversion circuit includes a transformer, a first diode, a capacitor, an N-type power switch and a first resistor. The transformer has a primary winding and an auxiliary winding, wherein an opposite-polarity terminal of the primary winding of the transformer receives the input voltage, and an opposite-polarity terminal of the auxiliary winding of the transformer is coupled to a dangerous ground. An anode of the first diode is coupled to a common-polarity terminal of the primary winding of the transformer, and a cathode of the first diode generates the output voltage. A first terminal of the capacitor is coupled to the cathode of the first diode, and a second terminal of the capacitor is coupled to a safety ground. A first terminal of the N-type power switch is coupled to the common-polarity terminal of the primary winding of the transformer, and a control terminal of the N-type power switch receives the pulse width modulation signal. A first terminal of the first resistor is coupled to a second terminal of the N-type power switch and provides an over current protection detection voltage to the control chip, and a second terminal of the first resistor is coupled to the dangerous ground.

In an exemplary embodiment of the invention, the current detection auxiliary circuit includes a second resistor and a third resistor. A first terminal of the second resistor is coupled to a common-polarity terminal of the auxiliary winding of the transformer, and a second terminal of the second resistor is coupled to the detection pin. A first terminal of the third resistor is coupled to the second terminal of the second resistor, and a second terminal of the third resistor is coupled to the dangerous ground.

In an exemplary embodiment of the invention, the control chip includes a control main body, a detection switch, a current detection main circuit and an over current protection unit. The control main body is configured to serve as an operation core of the control chip, and generate the pulse width modulation signal in response to the power supplying requirement. A first terminal of the detection switch is coupled to the detection pin, and a control terminal of the detection switch receives a control signal from the control main body. The detection switch is turned on in response to the control signal in the detection phase. The current detection main circuit is coupled between a second terminal of the detection switch and the control main body. The current detection main circuit is configured to perform the detection of the input voltage in the detection phase, and accordingly provide the first detection result relating to a variation of the input voltage to the control main body. The over current protection unit is coupled to the control main body, and has the over current protection point. The over current protection unit is configured to perform a detection of an over current protection in response to the over current protection detection voltage during an operation of the power factor correction power conversion apparatus, and accordingly provide a second detection result to the control main body.

In an exemplary embodiment of the invention, the control main body may be further configured to correspondingly output a compensation voltage to compensate the over current protection point in response to the first detection result.

In an exemplary embodiment of the invention, the control main body may be further configured to determine whether or not to activate the over current protection mechanism in response to the second detection result. When the control main body determines to activate the over current protection mechanism in response to the second detection result, the control main body stops outputting the pulse width modulation signal until the control main body determines to inactivate the over current protection mechanism in response to the second detection result.

In an exemplary embodiment of the invention, the power factor correction power conversion apparatus may further include a feedback unit. The feedback unit is coupled between the cathode of the first diode and the safety ground, and is configured to provide a feedback voltage to the control chip in response to the output voltage. In this case, the control chip may be further configured to regulate the output voltage to a predetermined target voltage in response to the feedback voltage.

In an exemplary embodiment of the invention, the control chip may be further configured to change the predetermined target voltage in response to the first detection result.

In an exemplary embodiment of the invention, the control main body may be further configured to determine whether or not to stop generating the pulse width modulation signal in response to the first detection result. In this case, when the first detection result satisfies with a brown out condition, the control main body stops generating the pulse width modulation signal.

Another exemplary embodiment of the invention provides a power factor correction power conversion method including: providing a boost power conversion circuit, and making the boost power conversion circuit to convert an input voltage in response to a pulse width modulation signal, so as to generate and provide an output voltage and a system voltage; providing a control chip operated under the system voltage, and making the control chip to generate the pulse width modulation signal in response to a power supplying requirement to control an operation of the boost power conversion circuit; providing a current detection auxiliary circuit coupled to the boost power conversion circuit and a detection pin of the control chip, and making the current detection auxiliary circuit to assist the control chip through the detection pin to perform a detection of the input voltage in a detection phase; and making the control chip to compensate an over current protection point corresponding to whether an over current protection mechanism is activated in response to a first detection result of the detected input voltage.

In an exemplary embodiment of the invention, the power factor correction power conversion method may further include: making the control chip to regulate the output voltage to a predetermined target voltage in response to a feedback voltage relating to the output voltage.

In an exemplary embodiment of the invention, the power factor correction power conversion method may further include: making the control chip further to change the predetermined target voltage in response to the first detection result.

In an exemplary embodiment of the invention, the power factor correction power conversion method may further include: making the control chip further to determine whether or not to stop generating the pulse width modulation signal in response to the first detection result.

In an exemplary embodiment of the invention, when the first detection result satisfies with a brown out condition, making the control chip to stop generating the pulse width modulation signal.

In an exemplary embodiment of the invention described above, when the input voltage is a relative high input voltage, the over current protection point after being compensated may be a first over current protection point; when the input voltage is a relative low input voltage, the over current protection point after being compensated may be a second over current protection point; and the first over current protection point and the second over current protection point are different.

In an exemplary embodiment of the invention described above, when the input voltage is a relative high input voltage, the predetermined target voltage may be a first predetermined target voltage; when the input voltage is a relative low input voltage, the predetermined target voltage may be a second predetermined target voltage; and the first predetermined target voltage may be larger than the second predetermined target voltage.

From the above, in the invention, by switching a detection switch disposed inside a control chip and connected to a detection pin of the control chip at a certain time, and performing a detection of an input voltage received by a boost power conversion circuit at the certain time through a collocation between a current detection auxiliary circuit and a current detection main circuit. Accordingly, an over current protection point corresponding to whether an over current protection mechanism is activated is compensated according to the detected result. In this way, the detection manner of the over current protection (OCP) performed by the invention may be adaptively suitable for different input voltages. On the other hand, in the invention, according to the detected result, a brown out protection also can be performed, and the output of the boost power conversion circuit also can be changed or determined.

It should be understood that both the foregoing general description and the following detailed description are exemplary, and are intended to provide further explanation of the invention as claimed without limiting the scope or the spirit of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
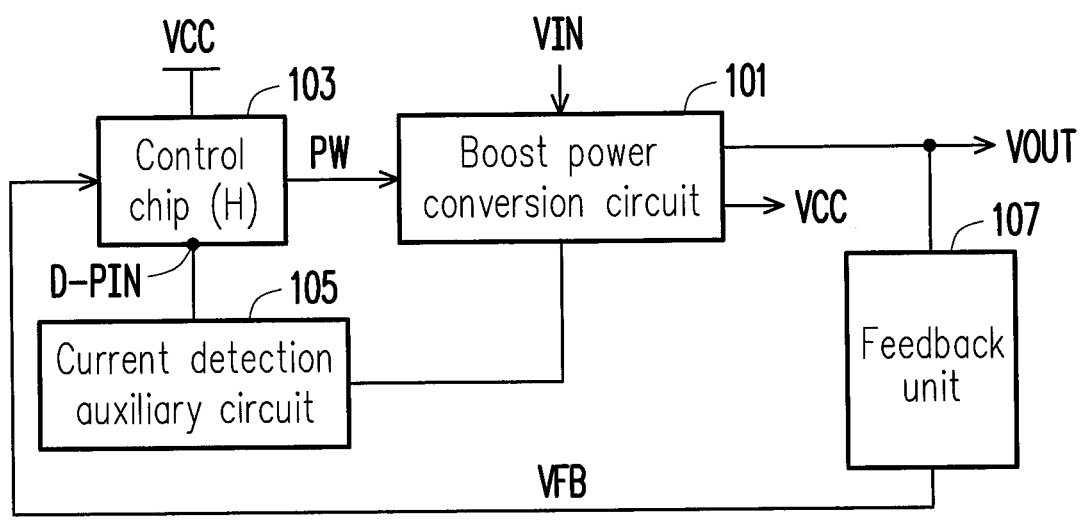
FIG. 1 is a diagram of a power factor correction power conversion apparatus (PFC power conversion apparatus) 10 according to an exemplary embodiment of the invention.

Reference will now be made in detail to the embodiments of the invention, examples of which are illustrated in the accompanying drawings. Wherever possible, the same reference numbers are used in the drawings and the description to refer to the same or like parts.

Figure 2:
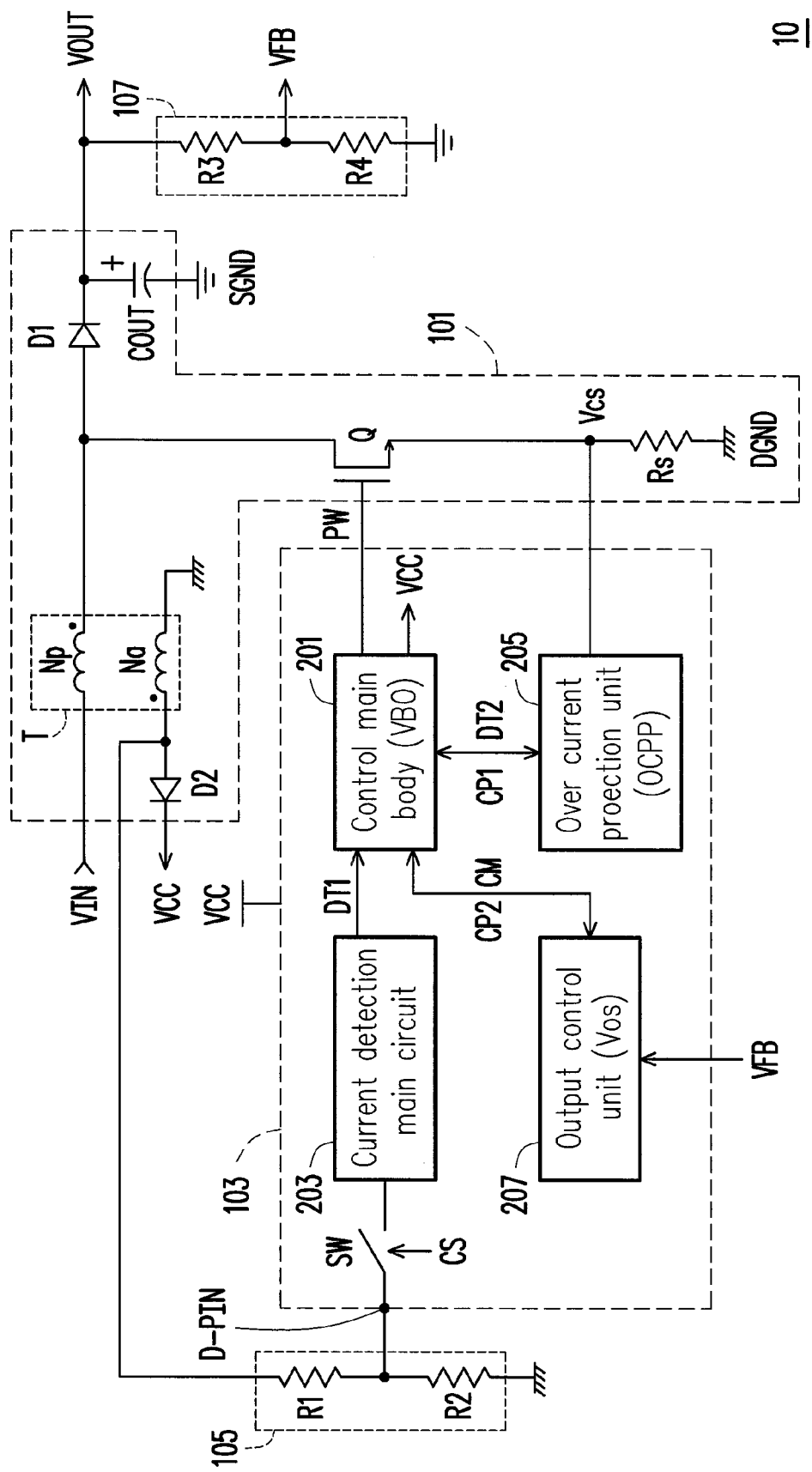
FIG. 2 is a circuit diagram of the power conversion apparatus 10 according to an exemplary embodiment of the invention.

FIG. 1 is a diagram of a power factor correction power conversion apparatus (PFC power conversion apparatus) 10 according to an exemplary embodiment of the invention, and FIG. 2 is a circuit diagram of the power conversion apparatus 10 according to an exemplary embodiment of the invention. Referring to FIG. 1 and FIG. 2, the topology of the power factor correction power conversion apparatus 10 is a boost-based topology. Accordingly, the power factor correction power conversion apparatus 10 includes a boost power conversion circuit 101, a control chip 103, a current detection auxiliary circuit 105 and a feedback unit 107.

In this exemplary embodiment, the boost power conversion circuit 101 is configured to receive an input voltage VIN and convert (that is, voltage conversion) the input voltage VIN in response to a pulse width modulation signal (PWM signal) PW from the control chip 103, so as to generate and provide an output voltage VOUT and a system voltage VCC.

The control chip 103 is coupled to the boost power conversion circuit 101, and operated under the system voltage VCC generated by the boost power conversion circuit 101. The control chip 103 is configured to generate the pulse width modulation signal PW to control the operation of the boost power conversion circuit 101 in response to a power supplying requirement of a load (such as an electronic device).

The current detection auxiliary circuit 105 is coupled to the boost power conversion circuit 101 and a detection pin D-PIN of the control chip 103. The current detection auxiliary circuit 105 is configured to assist the control chip 103 to perform a detection of the input voltage VIN through the detection pin D-PIN in a detection phase H. Accordingly, the control chip 103 would compensate an over current protection point OCPP corresponding to whether an over current protection mechanism is activated in response to a first detection result DT1 of the detected input voltage VIN.

The feedback unit 107 is coupled to the boost power conversion circuit 101 and the control chip 103. The feedback unit 107 is configured to provide a feedback voltage VFB relating to the output voltage VOUT to the control chip 103, so as to make the control chip 103 to regulate the output voltage VOUT generated by the boost power conversion circuit 101 in response to the feedback voltage VFB to a certain predetermined target voltage.

In detail, as illustrated in FIG. 2, the boost power conversion circuit 101 includes a transformer T, diodes D1 and D2, a capacitor COUT, an N-type power switch Q and a resistor Rs. In this exemplary embodiment, the transformer T has a primary winding Np and an auxiliary winding Na. An opposite-polarity terminal (that is, non-dotted terminal) of the primary winding Np of the transformer T receives the input voltage VIN, and an opposite-polarity terminal of the auxiliary winding Na of the transformer T is coupled to a dangerous ground DGND.

An anode of the diode D1 is coupled to a common-polarity terminal (that is, dotted terminal) of the primary winding Np of the transformer T, and a cathode of the diode D1 generates the output voltage VOUT. A first terminal of the capacitor COUT is coupled to the cathode of the diode D1, and a second terminal of the capacitor COUT is coupled to a safety ground SGND. A first terminal of the N-type power switch Q is coupled to the common-polarity terminal of the primary winding Np of the transformer T, and a control terminal of the N-type power switch Q receives the pulse width modulation signal PW from the control chip 103.

A first terminal of the resistor Rs is coupled to a second terminal of the N-type power switch Q and provides an over current protection detection voltage (OCP detection voltage) Vcs to the control chip 103, and a second terminal of the resistor Rs is coupled to the dangerous ground DGND. An anode of the diode D2 is coupled to the common-polarity terminal of the auxiliary winding Na of the transformer T, and a cathode of the diode D2 generates the system voltage VCC.

On the other hand, the current detection auxiliary circuit 105 includes resistors R1 and R2. A first terminal of the resistor R1 is coupled to the common-polarity terminal of the auxiliary winding Na of the transformer T, and a second terminal of the resistor R1 is coupled to the detection pin D-PIN of the control chip 103. A first terminal of the resistor R2 is coupled to the second terminal of the resistor R1, and a second terminal of the resistor R2 is coupled to the dangerous ground DGND.

In addition, the control chip 103 includes a control main body 201, a detection switch SW, a current detection main circuit 203, an over current protection unit (OCP unit) 205 and an output control unit 207. The control main body 201 is configured to serve as an operation core of the control chip 103, and generate the pulse width modulation signal PW in response to the power supplying requirement of the load (the electronic device).

A first terminal of the detection switch SW is coupled the detection pin D-PIN of the control chip 103, and a control terminal of the detection switch SW receives a control signal CS from the control main body 103. In this exemplary embodiment, the detection switch SW is turned on in response to the control signal CS in the detection phase H.

The current detection main circuit 203 is coupled between a second terminal of the detection switch SW and the control main body 201. The current detection main circuit 203 is configured to perform the detection of the input voltage VIN in the detection phase H, and accordingly provide the first detection result DT1 relating to the variation of the input voltage VIN to the control main body 201. For example, the current detection main circuit 203 may detect a current corresponding to the input voltage VIN of 90VAC-264VAC, but not limited thereto.

Figure 3:
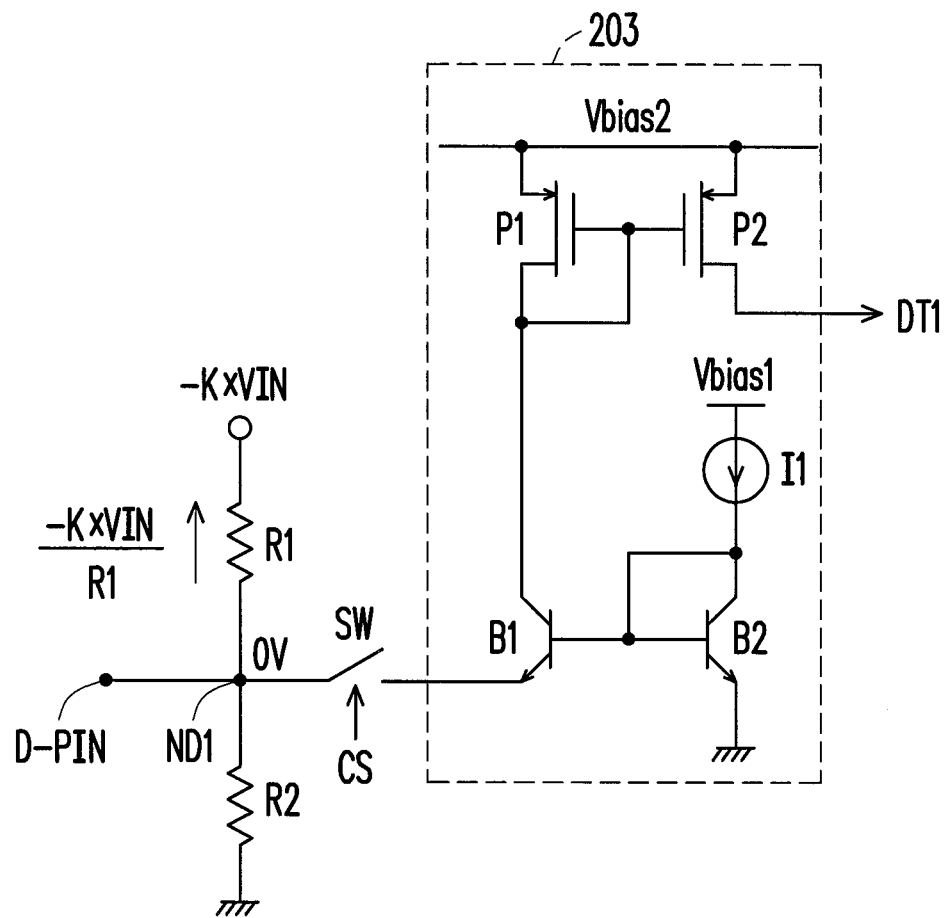
FIG. 3 is an implementation diagram of a current detection main circuit 203 according to an exemplary embodiment of the invention.

In detail, FIG. 3 is an implementation diagram of the current detection main circuit 203 according to an exemplary embodiment of the invention. Referring to FIG. 1 to FIG. 3, the current detection main circuit 203 includes NPN-type bipolar junction transistors (NPN-type BJTs) B1 and B2, a current source I1 and PMOS transistors P1 and P2. An emitter of the NPN-type bipolar junction transistor B1 is coupled to the second terminal of the detection switch SW. A base and a collector of the NPN-type bipolar junction transistor B2 are coupled to a base of the NPN-type bipolar junction transistor B1, and an emitter of the NPN-type bipolar junction transistor B2 is coupled to the dangerous ground DGND.

A first terminal of the current source I1 is coupled to a bias voltage Vbias1, and a second terminal of the current source I1 is coupled to the collector of the NPN-type bipolar junction transistor B2. A source of the PMOS transistor P1 is coupled to a bias voltage Vbias2, and a gate and a drain of the PMOS transistor P1 are coupled to a collector of the NPN-type bipolar junction transistor B1. A source of the PMOS transistor P2 is coupled to the bias voltage Vbias2, a gate of the PMOS transistor P2 is coupled to the gate of the PMOS transistor P1, and a drain of the PMOS transistor P2 outputs the first detection result DT1 relating to the variation of the input voltage VIN.

Moreover, the over current protection unit 205 is coupled to the control main body 201, and has the over current protection point OCPP. The over current protection unit 205 is configured to perform a detection of an over current protection (OCP) in response to the over current protection detection voltage Vcs across between two terminals of the resistor Rs during the operation of the power factor correction power conversion apparatus 10, and accordingly provide a second detection result DT2 to the control main body 201. In this exemplary embodiment, the control main body 201 may determine whether or not to activate the over current protection mechanism in response to the second detection result DT2 provided by the over current protection unit 205. Once the control main body 201 determines to activate the over current protection mechanism in response to the second detection result DT2 provided by the over current protection unit 205, the control main body 201 stops outputting the pulse width modulation signal PW until the control main body 201 determines to inactivate the over current protection mechanism (namely, no occurrence of the over current) in response to the second detection result DT2 provided by the over current protection unit 205.

In addition, due to the over current protection points (OCPP) corresponding to whether the respective over current protection (OCP) mechanisms are activated for the different input voltages of 90VAC to 264VAC are not identical. Therefore, in this exemplary embodiment, the control main body 201 may be further configured to correspondingly output a compensation voltage CP1 to the over current protection unit 205 in response to the first detection result DT1 relating to the variation of the input voltage VIN that provided by the current detection main circuit 203, so as to compensate the over current protection point OCPP corresponding to whether the over current protection mechanism is activated.

Figure 4:
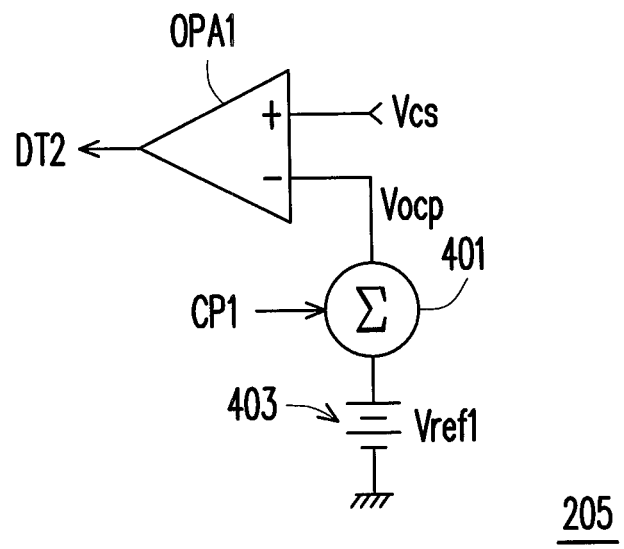
FIG. 4 is an implementation diagram of an over current protection unit 205 according to an exemplary embodiment of the invention.

In detail, FIG. 4 is an implementation diagram of the over current protection unit 205 according to an exemplary embodiment of the invention. Referring to FIG. 1 to FIG. 4, the over current protection unit 205 includes an operational amplifier OPA1, a compensation unit 401 and a reference voltage source 403. A positive input terminal (+) of the operational amplifier OPA1 receives the over current protection detection voltage Vcs across between two terminals of the resistor Rs, a negative input terminal (−) of the operational amplifier OPA1 receives an over current protection reference voltage Vocp corresponding to the over current protection point OCPP, and an output terminal of the operational amplifier OPA1 outputs the second detection result DT2.

The reference voltage source 403 is coupled between the compensation unit 401 and the dangerous ground DGND. The reference voltage source 403 is configured to provide a predetermined reference voltage Vref1. The compensation unit 401 is coupled to the control main body 201 and the negative input terminal (−) of the operational amplifier OPA1. The compensation unit 401 is configured to generate the over current protection reference voltage Vocp in response to the predetermined reference voltage Vref1 provided by the reference voltage source 403 and the compensation voltage CP1 from the control main body 201. In this exemplary embodiment, the compensation unit 401 may be a voltage operator, namely, capable of performing an addition or a subtraction of two voltages. In this way, the over current reference voltage Vocp generated by the compensation unit 401 may be represented as Vref1±CP1, that is, Vocp=Vref1±CP1.

Accordingly, it is known that when the input voltage VIN is a relative high input voltage such as an input voltage of 264VAC, as long as the control main body 201 provides an appropriate compensation voltage CP1, then the over current protection point OCPP after being compensated via the control main body 201 may be a first over current protection point; similarly, when the input voltage VIN is a relative low input voltage such as an input voltage of 90VAC, as long as the control main body 201 provides another appropriate compensation voltage CP1, then the over current protection point OCPP after being compensated via the control main body 201 may be a second over current protection point which is different from the first over current protection point. In this way, the over current protection unit 205 may be adaptively applied to different input voltages VIN, so as to perform an over current detection of different input voltages.

On the other hand, the feedback unit 107 is substantially coupled between the cathode of the diode D1 and the safety ground SGND. The feedback unit 107 is configured to provide the feedback voltage VFB to the control chip 101 in response to the output voltage VOUT generated by the boost power conversion circuit 101. In detail, the feedback unit 107 includes resistors R3 and R4, but the circuit configuration of the feedback unit 107 is not limited thereto. A first terminal of the resistor R3 is coupled to the cathode of the diode D1, and a second terminal of the resistor R3 generates the feedback voltage VFB. A first terminal of the resistor R4 is coupled to the second end of the resistor R3, and a second terminal of the resistor R4 is coupled to the safety ground SGND. Obviously, the feedback voltage VFB is substantially VOUT×(R4/(R3+R4)). In this way, the control chip 103 may regulate the output voltage VOUT generated by the boost power conversion circuit 101 to a predetermined target voltage, such as 400VDC, but not limited thereto, in response to the feedback voltage VFB from the feedback unit 107.

On the other hand, the output control unit 207 is coupled to the control main body 201 and the feedback unit 107. The output control unit 207 is configured to provide a comparison result CM to the control main body 201 in response to a comparison of the feedback voltage VFB provided by the feedback unit 107 and an output setting voltage Vos. In this way, the control main body 201 may regulate the output voltage VOUT generated by the boost power conversion circuit 101 to the predetermined target voltage in response to the comparison result CM provided by the output control unit 207.

Moreover, in order to improve the overall efficiency of the power factor correction power conversion apparatus 10, the control chip 103 may further be configured to change the predetermined target voltage, that is intended to be outputted by the boost power conversion circuit 101, in response to the first detection result DT1 relating to the variation of the input voltage VIN that is provided by the current detection main circuit 203. In other words, the output of the boost power conversion circuit 101 may be varied rather than fixed.

Figure 5:
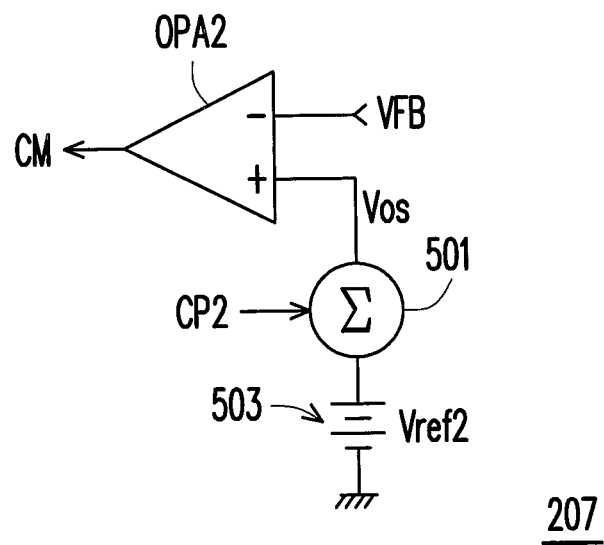
FIG. 5 is an implementation diagram of an output control unit 207 according to an exemplary embodiment of the invention.

In this exemplary embodiment, the control main body 201 may be configured to correspondingly output a compensation voltage CP2 to change the output setting voltage Vos in response to the first detection result DT1 relating to the variation of the input voltage VIN that is provided by the current detection main circuit 203, thereby changing the predetermined target voltage that is intended to be outputted by the boost power conversion circuit 101. In detail, FIG. 5 is an implementation diagram of the output control unit 207 according to an exemplary embodiment of the invention.

Referring to FIG. 1 to FIG. 5, the output control unit 207 includes an operational amplifier OPA2, a compensation unit 501 and a reference voltage source 503.

A positive input terminal (+) of the operational amplifier OPA2 receives the output setting voltage Vos, a negative input terminal (−) of the operational amplifier OPA2 receives the feedback voltage VFB from the feedback unit 107, and an output terminal of the operational amplifier OPA2 outputs the comparison result CM. The reference voltage source 503 is coupled between the compensation unit 501 and the dangerous ground DGND, and configured to provide a predetermined reference voltage Vref2. The compensation unit 501 is coupled to the control main body 201 and the positive input terminal (+) of the operational amplifier OPA2. The compensation unit 501 is configured to generate the output setting voltage Vos in response to the predetermined reference voltage Vref2 provided by the reference voltage source 503 and the compensation voltage CP2 from the control main body 201. Similarly, the compensation unit 501 may be a voltage operator, namely, capable of performing an addition or a subtraction of two voltages. In this way, the output setting voltage Vos generated by the compensation unit 501 may be represented as Vref2±CP2, that is, Vos=Vref2±CP2. Moreover, the generated output setting voltage Vos may determine the predetermined target voltage that is intended to be outputted by the boost power conversion circuit 101.

Accordingly, it is known that when the input voltage VIN is a relative high input voltage such as an input voltage of 264VAC, as long as the control main body 201 provides an appropriate compensation voltage CP2, then the predetermined target voltage that is intended to be outputted by the boost power conversion circuit 101 may be a first predetermined target voltage; similarly, when the input voltage VIN is a relative low input voltage such as an input voltage of 90VAC, as long as the control main body 201 provides another appropriate compensation voltage CP2, then the predetermined target voltage that is intended to be outputted by the boost power conversion circuit 101 may be a second predetermined target voltage. The first predetermined target voltage may be larger than the second predetermined target voltage. In this way, the output of the boost power conversion circuit 101 may change in response to the variation of the input voltage VIN (without being kept at a fixed value (for example, 400VDC)), so as to achieve the purpose of improving the overall efficiency of the power factor correction power conversion apparatus 10.

On the other hand, in this exemplary embodiment, the control main body 201 may further be configured to determine whether or not to stop generating the pulse width modulation signal PW in response to the first detection result DT1 relating to the variation of the input voltage VIN that is provided by the current detection main circuit 203. In detail, when the first detection result DT1 relating to the variation of the input voltage VIN that is provided by the current detection main circuit 203 satisfies with a brown out condition, for example, the input voltage VIN is less than a setting value VBO built-in by the control main body 201, it represents that the input voltage VIN is insufficient. In this way, the control main body 201 would stop generating the pulse width modulation signal PW, so as to protect (under a condition of constant power) the power factor correction power conversion apparatus 10 from damaging due to the insufficiency of the input voltage VIN.

According to the above descriptions, when the power factor correction power conversion apparatus 10 is under the normal operation, the control chip 103 correspondingly generates the pulse width modulation signal PW to control the operation of the boost power conversion circuit 101 in response to the power supplying requirement of the load (the electronic device). In this case, when the N-type power switch Q is turned on in response to the pulse width modulation signal PW generated by the control chip 103, the input voltage VIN is coupled cross with the primary winding Np of the transformer T, so that the inductor current of the primary winding Np of the transformer T linearity increases, so as to store energy on the primary winding Np of the transformer T until the N-type power switch Q is turned off in response to the pulse width modulation signal PW generated by the control chip 103.

Once the N-type power switch Q is turned off in response to the pulse width modulation signal PW generated by the control chip 103, the energy stored in the primary winding Np of the transformer T charges the capacitor COUT via the diode D1, and at this time, the output voltage VOUT and the system voltage VCC are respectively supplied to the load (the electronic device) and the control chip 103. Accordingly, it may be known that the operation manner for alternately turning on and turning off the N-type power switch Q due to the pulse width modulation signal PW generated by the control chip 103 may not only increase the input voltage VIN to the predetermined target voltage that is intended to be outputted, but also make the power factor correction power conversion apparatus 10 continuously to supply the output voltage VOUT and the system voltage VCC.

On the other hand, when power factor correction power conversion apparatus 10 is under the normal operation and the N-type power switch Q is turned on in response to the pulse width modulation signal PW generated by the control chip 103, at the moment, the control chip 103 enters the aforementioned detection phase H. In this case, the detection switch SW is turned on in response to the turned on of the N-type power switch Q, while the input voltage VIN is directly coupled cross with the primary winding Np of the transformer T, so that the voltage of the auxiliary winding Na of the transformer T is (−K*VIN), where K is the turns ratio of the auxiliary winding Na and the primary winding Np (Na/Np). Meanwhile, the current source I1 would provide the current ((−K*VIN)/R1) to flow through the resistor R1.

When the voltage on a node ND1 is fixed, the current flowing through the resistor R1 is proportional to (−K*VIN), namely, when the input voltage VIN is getting higher and higher, the current flowing through the resistor R1 is more and more; otherwise, when the input voltage VIN is getting lower and lower, the current flowing through the resistor R1 is less and less. In this way, the current detection main circuit 203 may obtain a current detection result that is in a proportional relationship with the input voltage VIN, so as to be served as the first detection result DT1. In other words, when every time the N-type power switch Q is turned on, the current detection main circuit 203 would detect the input voltage VIN, and accordingly provide the first detection result DT1 to the control main body 201.

Once the control main body 201 receives the first detection result DT1 from the current detection main circuit 203, the control main body 201 may accordingly obtain the amount of the input voltage VIN received by the boost power conversion circuit 101, and then provide an appropriate compensation voltage CP1 to compensate the over current protection point OCPP corresponding to whether the over current protection mechanism is activated. In this way, the over current protection unit 205 is adaptively applied to different input voltages VIN, so as to perform an over current detection for different input voltages, thereby the control main body 201 can activate the over current protection mechanism precisely.

Accordingly, during the operation of the power factor correction power conversion apparatus 10, the over current protection unit 205 may continuously perform the detection of the over current protection (OCP) in response to the over current protection detection voltage Vcs across between two terminals of the resistor Rs, and accordingly provide the second detection result DT2 to the control main body 201. Once the control main body 201 determines to activate the over current protection mechanism in response to the second detection result DT2 (logic "1") provided by the over current protection unit 205, the control main body 201 stops outputting the pulse width modulation signal PW, so as to protect the power factor correction power conversion apparatus 10 from damaging due to the phenomenon of over current, until the control main body 201 determines to inactivate the over current protection mechanism in response to the second detection result DT2 (logic "0") provided by the over current protection unit 205 (namely, no longer having the occurrence of over current).

On the other hand, in order to improve the overall efficiency of the power factor correction power conversion apparatus 10, the control main body 203 may further be configured to correspondingly output the compensation voltage CP2 to change the output setting voltage Vos in response to the first detection result DT1 relating to the variation of the input voltage VIN that is provided by the current detection main circuit 203 in the detection phase H, thereby changing the predetermined target voltage that is intended to be outputted by the boost power conversion circuit 101.

In detail, the control main body 201 may obtain the amount of the input voltage VIN through the current detection main circuit 203 and the current detection auxiliary circuit 105 in the detection phase H. Therefore, as long as the control main body 201 provides, in response to the variation of the input voltage VIN, an appropriate compensation voltage CP2 to the output control unit 207, the predetermined target voltage that is intended to be outputted by the boost power conversion circuit 101 may be changed. In other words, the output of the boost power conversion circuit 101 may change (without being kept at a fixed value (for example, 400VDC)) in response to the variation of the input voltage VIN, so as to achieve the purpose of improving the overall efficiency of the power factor correction power conversion apparatus 10.

Similarly, the control main body 201 may obtain the amount of the input voltage VIN through the current detection main circuit 203 and the current detection auxiliary circuit 105 in the detection phase H. Therefore, as long as the control main body 201 determines that the input voltage VIN in the detection phase H is insufficient (that is, the brown out condition is satisfied under the input voltage VIN is less than the setting value VBO built-in by the control main body 201), the control main body 201 would stop generating the pulse width modulation signal PW, so as to protect the power factor correction power conversion apparatus 10 from damaging due to the insufficiency of the input voltage VIN, until the control main body 201 determines that of the input voltage VIN in the detection phase H is sufficient (that is, the brown out condition is not satisfied under the input voltage VIN is not less than the setting value VBO built-in by the control main body 201).

Accordingly, it may be known that after the control main body 201 obtains the first detection result DT1 from the current detection main circuit 203, the control main body 201 may (1) compensate the over current protection point OCPP corresponding to whether the over current protection mechanism is activated; (2) control the output of the boost power conversion circuit 101; and (3) perform the brown out protection on the basis of the variation of the input voltage VIN.

Figure 6:
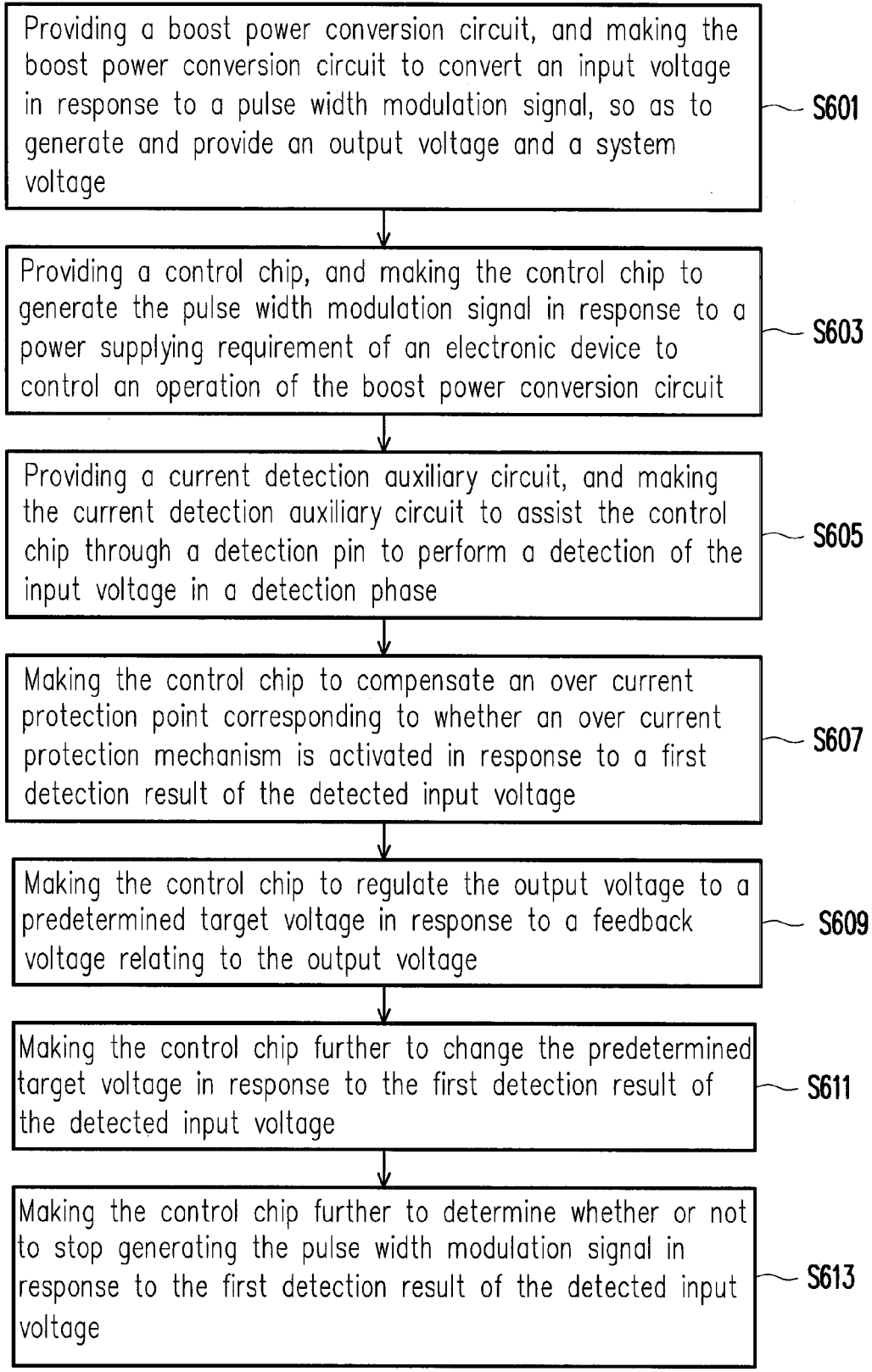
FIG. 6 is a flow chart of a power factor correction power conversion method according to an exemplary embodiment of the invention.

Based upon the content disclosed or taught by the above-described exemplary embodiments, FIG. 6 is a flow chart of a power factor correction power conversion method according to an exemplary embodiment of the invention. Referring to FIG. 6, the power factor correction power conversion method of the exemplary embodiment includes the following steps of:

Providing a boost power conversion circuit, and making the boost power conversion circuit to convert an input voltage in response to a pulse width modulation signal, so as to generate and provide an output voltage and a system voltage (step S601);

Providing a control chip operated under the system voltage, and making the control chip to generate the pulse width modulation signal in response to a power supplying requirement of an electronic device to control an operation of the boost power conversion circuit (step S603);

Providing a current detection auxiliary circuit coupled to the boost power conversion circuit and a detection pin of the control chip, and making the current detection auxiliary circuit to assist the control chip through the detection pin to perform a detection of the input voltage in a detection phase (step S605);

Making the control chip to compensate an over current protection point corresponding to whether an over current protection mechanism is activated in response to a first detection result of the detected input voltage (step S607);

Making the control chip to regulate the output voltage to a predetermined target voltage in response to a feedback voltage relating to the output voltage (step S609);

Making the control chip further to change the predetermined target voltage in response to the first detection result of the detected input voltage (step S611); and Making the control chip further to determine whether or not to stop generating the pulse width modulation signal in response to the first detection result of the detected input voltage (step S613).

In this exemplary embodiment, when the input voltage is a relative high input voltage, the over current protection point after being compensated may be a first over current protection point; when the input voltage is a relative low input voltage, the over current protection point after being compensated may be a second over current protection point; and the first over current protection point and the second over current protection point are different. In addition, when the input voltage is a relative high input voltage, the predetermined target voltage may be a first predetermined target voltage; when the input voltage is a relative low input voltage, the predetermined target voltage may be a second predetermined target voltage; and the first predetermined target voltage may be more than the second predetermined target voltage. Furthermore, when the first detection result of the detected input voltage satisfies with a brown out condition, making the control chip to stop generating the pulse width modulation signal.

In summary, in the invention, by switching a detection switch disposed inside a control chip and connected to a detection pin of the control chip at a certain time, and performing a detection of an input voltage received by a boost power conversion circuit at the certain time through a collocation between a current detection auxiliary circuit and a current detection main circuit. Accordingly, an over current protection point corresponding to whether an over current protection mechanism is activated is compensated according to the detected result. In this way, the detection manner of the over current protection (OCP) performed by the invention may be adaptively suitable for different input voltages. On the other hand, in the invention, according to the detected result, a brown out protection also can be performed, and the output of the boost power conversion circuit also can be changed or determined.

Accordingly, it may be known that the invention may (1) compensate the over current protection point OCPP corresponding to whether the over current protection mechanism is activated; (2) control the output of the boost power conversion circuit 101; and (3) perform the brown out protection on the basis of the variation of the input voltage VIN. In this way, the overall function and efficiency of the power factor correction power conversion apparatus may be enhanced substantially.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents. In addition, the abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A power factor correction power conversion apparatus, comprising:
    a boost power conversion circuit, configured to receive an input voltage and convert the input voltage in response to a pulse width modulation signal, so as to generate and provide an output voltage, wherein the boost power conversion circuit comprises:
        a transformer, having a primary winding and an auxiliary winding, wherein an opposite-polarity terminal of the primary winding receives the input voltage, and an opposite-polarity terminal of the auxiliary winding is coupled to a dangerous ground;
        a first diode, having an anode coupled to a common-polarity terminal of the primary winding, and a cathode generating the output voltage;
        a capacitor, having a first terminal coupled to the cathode of the first diode, and a second terminal coupled to a safety ground;
        an N-type power switch, having a first terminal coupled to the common-polarity terminal of the primary winding, and a control terminal receiving the pulse width modulation signal; and
        a first resistor, having a first terminal coupled to a second terminal of the N-type power switch and providing an over current protection detection voltage to the control chip, and a second terminal coupled to the dangerous ground;
    a control chip, coupled to the boost power conversion circuit, configured to generate the pulse width modulation signal in response to a power supplying requirement to control an operation of the boost power conversion circuit, wherein the control chip comprises:
        a control main body, configured to serve as an operation core of the control chip, and generate the pulse width modulation signal in response to the power supplying requirement;
        a detection switch, having a first terminal coupled to the detection pin, and a control terminal receiving a control signal from the control main body, wherein the detection switch is turned on in response to the control signal in the detection phase;
        a current detection main circuit, coupled between a second terminal of the detection switch and the control main body, configured to perform the detection of the input voltage in the detection phase, and accordingly provide the first detection result relating to a variation of the input voltage to the control main body; and
        an over current protection unit, coupled to the control main body and having the over current protection point, configured to perform a detection of an over current protection in response to the over current protection detection voltage during an operation of the power factor correction power conversion apparatus, and accordingly provide a second detection result to the control main body; and
    a current detection auxiliary circuit, coupled to the boost power conversion circuit and a detection pin of the control chip, configured to assist the control chip to perform a detection of the input voltage in a detection phase, wherein the current detection auxiliary circuit comprises:
        a second resistor, having a first terminal coupled to a common-polarity terminal of the auxiliary winding, and a second terminal coupled to the detection pin; and
        a third resistor, having a first terminal coupled to the second end of the second resistor, and a second terminal coupled to the dangerous ground;
    wherein the control chip compensates, in response to a first detection result of the detected input voltage, an over current protection point corresponding to whether an over current protection mechanism is activated,
    wherein when the input voltage is a relative high input voltage, the over current protection point after being compensated by the control chip is a first over current protection point;
    wherein when the input voltage is a relative low input voltage, the over current protection point after being compensated by the control chip is a second over current protection point;
    wherein the first over current protection point and the second over current protection point are different.

2. The power factor correction power conversion apparatus as claimed in claim 1, wherein the current detection main circuit comprises:
    a first NPN-type bipolar junction transistor, having an emitter coupled to the second terminal of the detection switch;
    a second NPN-type bipolar junction transistor, having a base and a collector both coupled to a base of the first NPN-type bipolar junction transistor, and an emitter coupled to the dangerous ground;
    a current source, having a first terminal coupled to a first bias voltage, and a second terminal coupled to the collector of the second NPN-type bipolar junction transistor;

a first PMOS transistor, having a source coupled to a second bias voltage, and a gate and a drain both coupled to a collector of the first NPN-type bipolar junction transistor; and a second PMOS transistor, having a source coupled to the second bias voltage, a gate coupled to the gate of the first PMOS transistor, and a drain outputting the first detection result relating to the variation of the input voltage.

3. The power factor correction power conversion apparatus as claimed in claim 1, wherein the control main body is further configured to correspondingly output a compensation voltage to compensate the over current protection point in response to the first detection result.

4. The power factor correction power conversion apparatus as claimed in claim 3, wherein the over current protection unit comprises:

an operational amplifier, having a positive input terminal receiving the over current protection detection voltage, a negative input terminal receiving an over current protection reference voltage corresponding to the over current protection point, and an output terminal outputting the second detection result;

a compensation unit, coupled to the control main body and the negative input terminal of the operational amplifier, configured to generate the over current protection reference voltage in response to a predetermined reference voltage and the compensation voltage; and a reference voltage source, coupled between the compensation unit and the dangerous ground, configured to provide the predetermined reference voltage.

5. The power factor correction power conversion apparatus as claimed in claim 1, wherein:

the control main body is further configured to determine whether or not to activate the over current protection mechanism in response to the second detection result; and when the control main body determines to activate the over current protection mechanism in response to the second detection result, the control main body stops outputting the pulse width modulation signal until the control main body determines to inactivate the over current protection mechanism in response to the second detection result.

6. The power factor correction power conversion apparatus as claimed in claim 1, further comprising:

a feedback unit, coupled between the cathode of the first diode and the safety ground, configured to provide a feedback voltage to the control chip in response to the output voltage, wherein the control chip is further configured to regulate the output voltage to a predetermined target voltage in response to the feedback voltage.

7. The power factor correction power conversion apparatus as claimed in claim 6, wherein the control chip is further configured to change the predetermined target voltage in response to the first detection result, wherein when the input voltage is a relative high input voltage, the predetermined target voltage is a first predetermined target voltage, wherein when the input voltage is a relative low input voltage, the predetermined target voltage is a second predetermined target voltage, wherein the first predetermined target voltage is larger than the second predetermined target voltage.

8. The power factor connection power conversion apparatus as claimed in claim 7, wherein the control chip further comprises:

an output control unit, coupled to the control main body and the feedback unit, configured to provide a comparison result to the control main body in response to a comparison of the feedback voltage and an output setting voltage, wherein the control main body is further configured to regulate the output voltage to the predetermined target voltage in response to the comparison result, wherein the control main body is further configured to correspondingly output a compensation voltage to change the output setting voltage in response to the first detection result, and thereby changing the predetermined target voltage.

9. The power factor correction power conversion apparatus as claimed in claim 8, wherein the output control unit comprises:

an operational amplifier, having a positive input terminal receiving the output setting voltage, a negative input terminal receiving the feedback voltage, and an output terminal outputting the comparison result;

a compensation unit, coupled to the control main body and the positive input terminal of the operational amplifier, configured to generate the output setting voltage in response to a predetermined reference voltage and the compensation voltage; and a reference voltage source, coupled between the compensation unit and the dangerous ground, configured to provide the predetermined reference voltage.

10. The power factor correction power conversion apparatus as claimed in claim 1, wherein:

the control main body is further configured to determine whether or not to stop generating the pulse width modulation signal in response the first detection result; and when the first detection result satisfies with a brown out condition, the control main body stops generating the pulse width modulation signal.

11. The power factor correction power conversion apparatus as claimed in claim 1, wherein:

the boost power conversion circuit is further configured to convert the input voltage in response to the pulse width modulation signal, so as to generate and provide a system voltage; and the control chip is operated under the system voltage, and the boost power conversion circuit further comprises a second diode, having an anode coupled to the common-polarity terminal of the auxiliary winding, and a cathode generating the system voltage.

* * * * *